United States Patent [19]
Ishikawa et al.

[11] Patent Number: 5,509,973
[45] Date of Patent: Apr. 23, 1996

[54] ROOF PANEL AND ROOF STRUCTURE WITH SOLAR BATTERIES

[75] Inventors: Osamu Ishikawa; Naoko Oya; Michio Sasaki; Akio Miwa, all of Tokyo, Japan

[73] Assignees: Misawa Homes Co., Ltd.; Shin Nikkei Company, Ltd., both of Tokyo, Japan

[21] Appl. No.: 223,507

[22] Filed: Apr. 6, 1994

[30] Foreign Application Priority Data

| Apr. 8, 1993 | [JP] | Japan | 5-082249 |
| Apr. 8, 1993 | [JP] | Japan | 5-082250 |
| Apr. 8, 1993 | [JP] | Japan | 5-082251 |

[51] Int. Cl.$^6$ ............................... E04D 13/18
[52] U.S. Cl. ............. 136/251; 136/291; 52/173.3
[58] Field of Search ........................... 136/244, 246, 136/251, 291; 52/173.3

[56] References Cited

U.S. PATENT DOCUMENTS

| 4,336,413 | 6/1982 | Tourneux | 136/251 |
| 4,636,577 | 1/1987 | Peterpaul | 136/206 |
| 4,677,248 | 6/1987 | Lacey | 136/244 |
| 4,936,063 | 6/1990 | Humphrey | 52/200 |
| 5,164,020 | 11/1992 | Wagner et al. | 136/251 |
| 5,338,369 | 8/1994 | Rawlings | 136/246 |

FOREIGN PATENT DOCUMENTS

| 59-175169 | 10/1984 | Japan | 136/251 |
| 4-67349 | 10/1992 | Japan | 136/251 |

Primary Examiner—Aaron Weisstuch
Attorney, Agent, or Firm—Lowe, Price, LeBlanc & Becker

[57] ABSTRACT

A roof panel with solar batteries and a roof structure with solar batteries, which can improve water blocking between adjacent solar batteries integral with the roof panel. On the inclined surface of the roof Y is disposed the base panel 2, on which support rails 37 (each having a two-stage structure with a gutter and a cylindrical section 37a and 37b) are provided. A plurality of solar battery panels 3, provided with a frame (having an upper and a lower frame member 6 and 7 and paired vertical frame members 8) therearound, are each provided between paired support frames 37. The lower frame member 7 has an extension 25 extending from its side nearer the eaves N and covering the upper frame member 6 of the adjacent panel 3. The base and solar battery panels 2 and 3 are made integral with one another in the factory to be supplied as a roof panel 1 with solar batteries. With this structure, water is blocked around the solar battery panel 3 by the frame (6 to 8) therearound. Rainwater having fallen onto the surface of the panel 3 is drained along the extension 25 to the panel 3 on the side of the eaves N, or is led side-wise to support rails (i.e., gutter sections 37a thereof) to be drained to the side of the eaves N.

16 Claims, 7 Drawing Sheets

ROOF PANEL AND ROOF STRUCTURE WITH SOLAR BATTERIES

BACKGROUND OF THE INVENTION

1. FIELD OF THE INVENTION

This invention relates to roof panels with solar batteries (solar batteries and solar array are considered identical nomenclature) and roof structures with solar batteries, these roof panels and structure being capable of application to roof portions of houses and like buildings.

2. DESCRIPTION OF THE RELATED ART

Heretofore, for energy conservation it has been the practice to install a plurality of solar batteries on roofs of houses or like building structures and supply power from these solar batteries to the home.

The general way of installing solar batteries on the roof is a base securement system, in which panel-like solar batteries are secured to an available roof via an exclusive base.

Meanwhile, in the case of a house which is built by a panel process, there is a technique of dispensing with the exclusive base noted above by using a roof panel with solar batteries, in which a plurality of solar batteries are provided integrally with the top of a roof panel constituting a roof.

In the above roof panel with solar batteries, it is particularly necessary to improve protection from water (i.e., rainwater blocking) when mounting the solar batteries integrally with the roof panel, and development of techniques to this end has been desired.

Particularly, there is a problem of rainwater blocking among a plurality of solar batteries, and it has been difficult to produce a perfect water blocking groove structure.

The present invention has been completed in view of the above circumstances, and its object is to provide a roof panel with solar batteries and a roof structure with solar batteries, which permit improvement of the water blocking between adjacent solar batteries which are integral with the roof panel.

SUMMARY OF THE INVENTION

According to the invention, the solar batteries that are used are supported with respective frames, which are collectively supported on support rails extending in the direction of the roof inclination such that rainwater falling onto the surfaces of the solar batteries and support rails can be led toward the roof eaves for draining.

In addition, with a structure according to the invention, rainwater, which may enter the space between the solar battery and the frame thereof, the space between each frame and each support rail, and the space between adjacent frames, can be received to be drained toward the eaves of the roof.

Specifically, according to the invention there is provided a roof panel with solar batteries, which comprises a base panel disposed along the roof inclination from the ridge to the eaves and a plurality of solar battery panels disposed over the base panel;

the solar battery panels each including a solar battery in the form of a rectangular disk and a frame mounted around the solar battery;

a plurality of parallel gutter-like support rails being secured to the upper surface of the base panel such that they extend in the direction of roof inclination;

the frames each being supported so as to be accommodated inside associated ones of the support rails.

In such a structure, the solar battery panels which are arranged in rows extending in the direction of roof inclination are supported via their frames on the support rails which extend in the direction of roof inclination. Thus, seam portions of adjacent solar batteries which are arranged side-by-side in the horizontal direction (i.e., the direction perpendicular to the direction of roof inclination) are supported by support rails. It is thus possible to ensure water blocking without need of any special rainwater blocking structure for the seam portions.

Further, since the frame is mounted around each solar battery, a seal can be readily ensured between adjacent solar batteries.

Further, by making the support rails to be gutter-like, rainwater falling on the support rails can be readily drained.

It is thus possible to reliably prevent the base panel from being wetted by rainwater, and there is no need of any special rainwater blocking structure for the solar battery panel seam portions.

Further, according to the invention each support rail has a two-stage structure including a gutter section capable of accommodating an associated portion of each frame and a cylindrical section formed under and integral with the gutter section; and each frame is supported such that it is accommodated in associated ones of the gutter sections.

With such a structure, in which each support rail has a two-stage structure including a gutter section and a cylindrical section, with each frame accommodated in associated gutter sections, rainwater flows through the gutter sections, and if it overflows over the gutter sections, it can be received by the cylindrical sections.

It is thus possible to more reliably prevent the leakage of rainwater to the base panel, and it is thus possible to realize further simplification of the solar battery panel seam portions.

Further, according to the invention the frame includes four cylindrical frame members, two of which are upper and lower frame members mounted on two parallel edges of the four edges of the solar battery, and the other two of which are left and right vertical frame members are mounted on the other two of the four edges; and the left and right vertical frame members are supported such that they are accommodated inside associated gutter-like support rails, at least the inner space in the lower frame member being communicated with the inside of the associated gutter-like support rails.

With such a structure, rainwater which may enter the lower frame member through the space between the solar battery and the lower frame member flows into the inside of the support rails, which the inside of the lower frame member is communicated with, thus being drained through the support rails.

Particularly, improved properties of water draining and water blocking of the solar battery panel are obtainable by adopting the above structure for the lower frame member, which is disposed on the lower side (i.e., on the eaves side) and a greater proportion of rainwater enters it.

Further, according to the invention the frame has an extension extending from its eaves side portion and covering the top of a ridge side portion of the frame of the eaves side adjacent solar battery panel; and the extension has an edge substantially aligned to the eaves side edge of a ridge side portion of the frame of the eaves side adjacent solar battery panel.

With such a structure, rainwater which may flow from the ridge side solar battery panel to the eaves side adjacent solar battery panel, falls from the ridge side frame extension onto the eaves side adjacent solar battery panel.

In this case, since the extension covers the ridge side frame of the eaves side solar battery frame, it is difficult for rainwater to enter between the two solar battery panels. Thus, it is possible to provide a solar battery panel which has improved properties of draining and blocking of water.

Further, since the extension has an edge which is substantially aligned to the eaves side edge of a ridge side portion of the frame of the eaves side adjacent solar battery panel, the eaves side frame portion that is covered by the extension is not exposed at the surface. It is thus possible to obtain improved appearance.

Further, according to the invention, support rails are provided in pairs each in correspondence to facing sides of adjacent solar battery panels in a direction perpendicular to the direction of roof inclination, a seal member being provided between adjacent side vertical walls of the gutter sections of the paired adjacent support rails, another seal member being provided such that it strides the upper ends of the two adjacent side vertical walls.

With such a structure, support rails for supporting the both sides of the solar battery panel may be used which support only a single side. In addition, the same support frame may be utilized for the ends of the solar battery panel row (without adjacent solar battery panel in the direction perpendicular to the direction of roof inclination) and also intermediate points (with adjacent solar battery panel) thereof. With this arrangement, it is possible to ensure water blocking between two support rails.

Further, according to the invention, a predetermined space serving as a ventilating layer is formed between the back surface of each solar panel and the base panel, the ventilating layer being open to the outside at its eaves and ridge side edges.

With such a structure, external air that passes through the ventilating layer cools the solar battery to improve the power efficiency. In addition, rainwater which may rarely enter the system from the solar battery part, may be received by the base panel surface facing the ventilating layer and drained toward the eaves.

DETAILED DESCRIPTION OF THE PREFERRED EMBODIMENT(S)

Now, an embodiment of the invention will be described.

Figure 1:
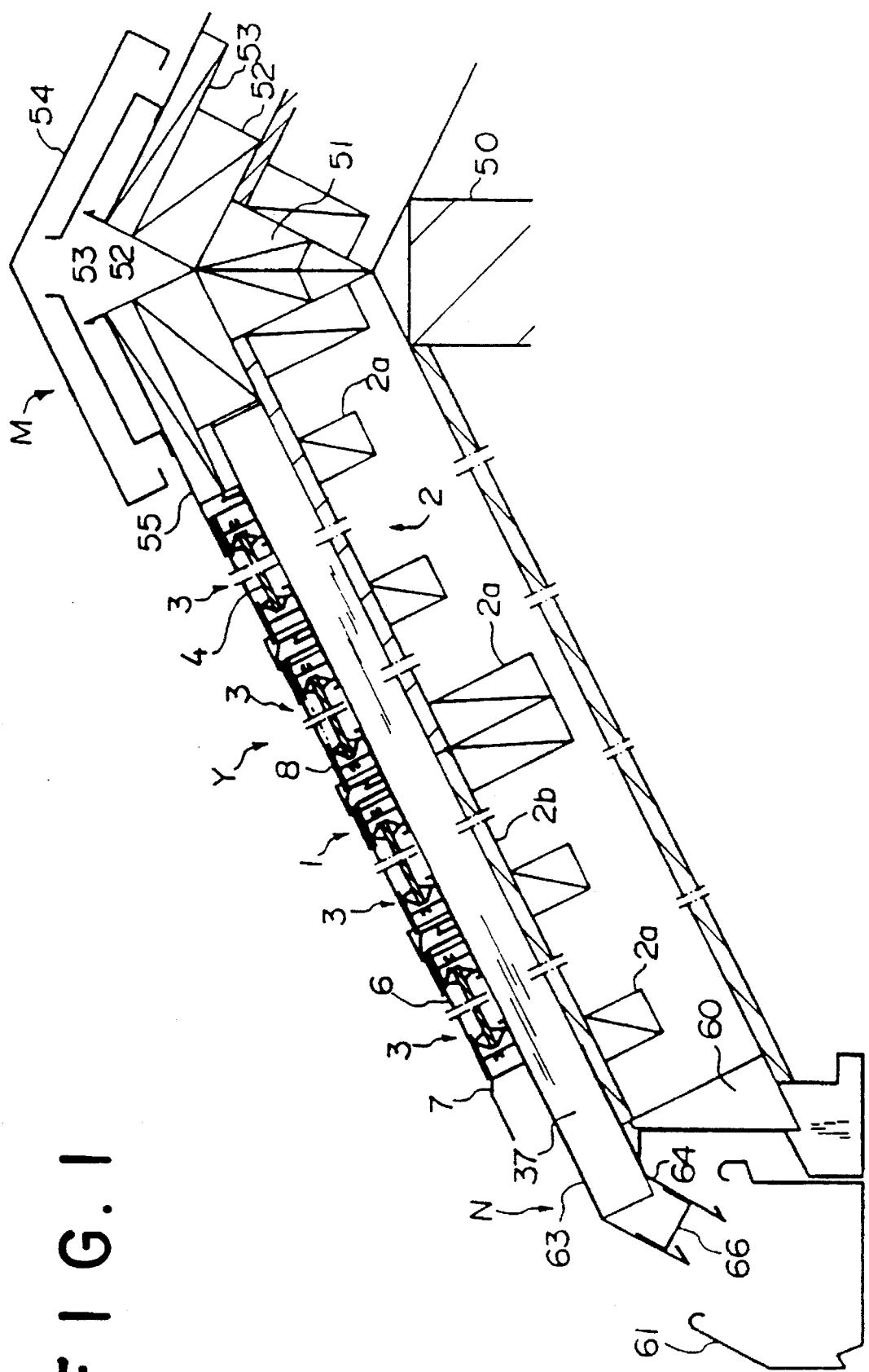
FIG. 1 is a sectional view showing an embodiment of the invention.

FIG. 1 is a sectional view showing an embodiment of the invention applied to the house roof structure extending from the ridge to the eaves. Referring to FIG. 1, reference numeral 1 designates a rectangular roof panel with solar batteries according to the invention. The roof panel 1 is disposed such that its longitudinal direction is from the ridge M to the eaves N, and it constitutes a roof Y.

The roof panel 1 with solar batteries comprises a rectangular base panel 2 with a panel sheet 2b thereof disposed on a plurality of core members 2a assembled in longitudinal and transversal directions and a plurality of solar battery panels 3 provided on the base panel 2.

Each solar battery panel 3, as shown in FIGS. 2 to 5, comprises a rectangular panel-shaped solar battery 4, which has a large number of solar battery cells provided in a transparent plate, grading channel members 5 detachably fitted on the four edges of the solar battery 4, and a frame of the solar battery panel 3, which is detachably mounted around the grading channel members 5 and consists of four frame members, i.e., an upper and lower frame member 6 and 7 and a pair of, i.e., left and right side, vertical frame members 8.

Each grading channel member 5 is a channel-shaped member, in which an edge of the solar battery 4 is fitted. It is made of a material having a certain elasticity, and it integrally has a substantially flat inner wall portion 9, side wall portions 10 extending from the opposite width direction edges of the inner wall portion 9 substantially at right angles thereto, a head portion 11 having a frust-conical sectional profile and terminating in the side wall portions 10, and a pair of tongue portions integrally extending from the inner surfaces of the side wall portions 10 toward each other (i.e., in the width direction).

The inner wall portion 9 of the grading channel member 5 has a central engagement notch 5a extending in the longitudinal direction. The inner wall portion 9 has ribs 9a extending from its opposite width direction edges and extending slightly outward with respect to the side wall portions 10. Also, the head portion 11 has ribs 11a slightly extending outward from its opposite width direction edges. With these ribs, engagement grooves 5b are formed in the opposite sides (i.e., upper and lower sides in the Figure) of the grading channel member 5 such that they extend in the longitudinal direction thereof.

The grading channel member 5 is fitted on the solar battery 4 by fitting its engagement notch on the corresponding edge of the solar battery 4 until the edge thereof is in contact with the inner surface of the head portion 11. In this state, the surfaces of the inner wall portion 9 defining the engagement notch 5a are held pushed against and in close contact with the edge of the solar battery 4. In addition, the tongues 12 are elastically deformed by the inserted edge of the solar battery 4, and their edges are in close contact with the solar battery edge.

The frame members 6 to 8, as noted above, are mounted on the grading channel members 5 fitted on the edges of the solar battery 4 and form a frame thereof. These frame members are of three different kinds, i.e., the upper and lower frame members 6 and 7 which are mounted on opposite sides of the solar battery 4 and the vertical frame members 8 mounted on the other opposite sides.

The solar battery 3 is disposed such that the upper frame member 6 is directed toward the ridge M, the lower frame member 7 is directed toward the eaves N and the vertical frame members 8 extend in the direction of inclination of the roof Y. These frame members 6 to 8 may be fabricated by extrusion molding aluminum or the like.

Figure 2:
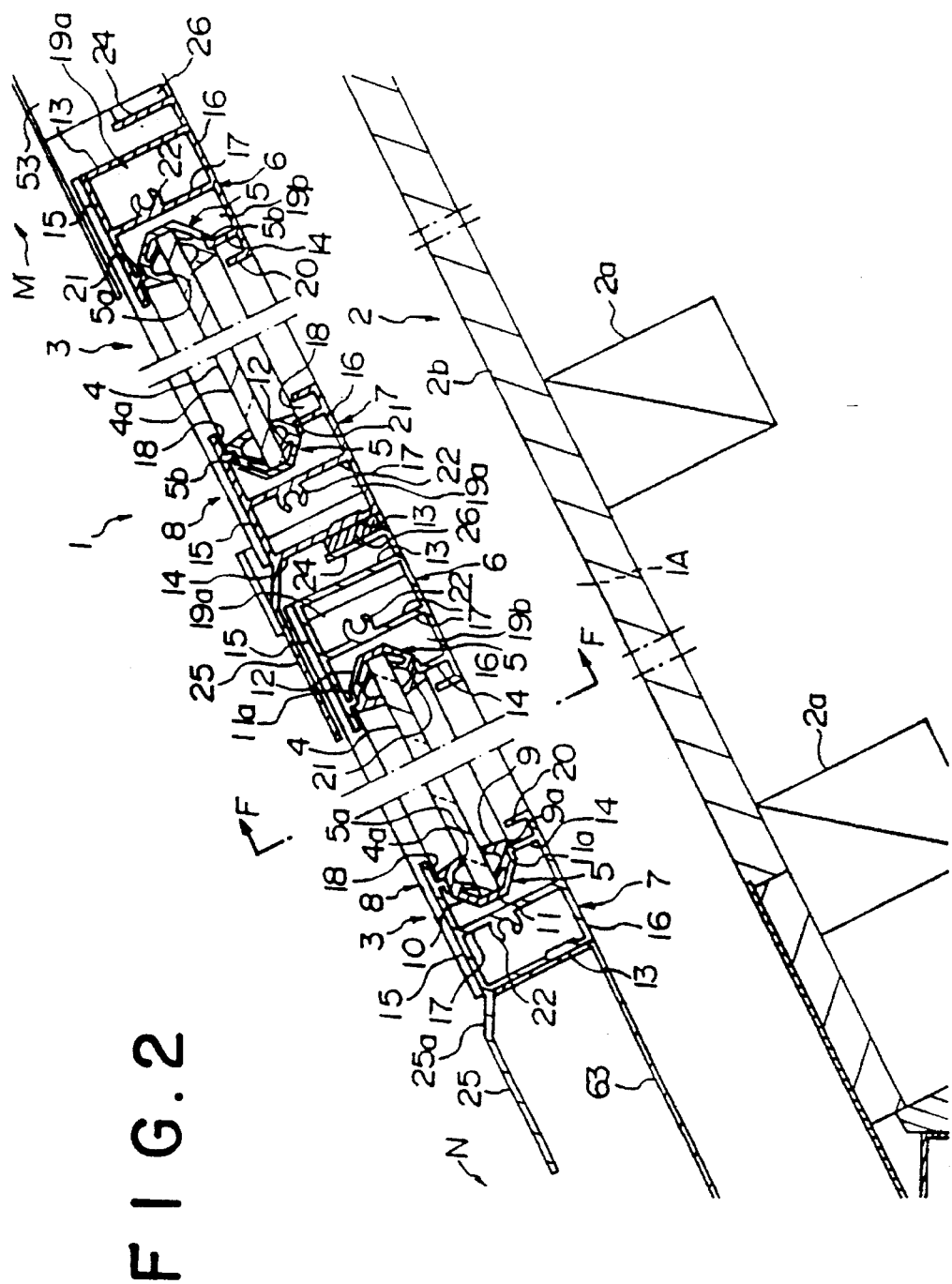
FIG. 2 is a fragmentary enlarged-scale sectional view showing the embodiment shown in FIG. 1.

The upper and lower frame members 6 and 7, as shown in FIG. 2, have basically the same structure.

Specifically, they each integrally have an outer and an inner wall 13 and 14, which are parallel and facing each other, an upper and a lower wall 15 and 16, which are parallel and facing each other, and a partitioning wall 17, which is provided between the outer and inner walls 13 and 14 and extends between the upper and lower walls 15 and 16. The inner wall 14 has an opening 18 which extends in the longitudinal direction. The frame member is cylindrical having a substantially rectangular sectional profile, with an outside cavity 19 defined by the outer, inner, upper and lower walls 13 to 16.

The lower wall 16 has an integral projection 20 extending perpendicularly from its edge toward the upper wall 15. The edge of the inner wall 14 adjacent the opening 18 has a short engagement projection 21, which extends toward the partitioning wall 17 and is tightly fitted in the corresponding engagement groove 5b of the grading channel member 5. The partitioning wall 17 is parallel to the outer and inner walls 13 and 14, and the inner side of the partitioning wall 17, i.e., the inner surface thereof facing the outer wall 13, has an integral bolt hole piece 22. At the opposite longitudinal direction ends of the inner wall 14, the edge thereof on the side of the opening 18 is formed with a rectangular notch 23.

The upper and lower frame members 6 and 7 are different from each other in that in the upper frame member 6 the outer wall 13 has an integral contact portion 24 having an L-shaped sectional profile, whereas in the lower frame member 7 the upper wall 15 has an integral extension 25 extending outward to a greater extent than that of the upper frame member 6.

The contact portion 24 extends in the longitudinal direction from the end of the outer wall 13 nearer the lower wall 16. Its end portion is provided with a seal member 22a applied thereto. The extension 25 has an inclined portion 25a extending from the upper wall 15 in a slightly upwardly inclined direction and a portion extending from the inclined portion 25a in a direction parallel to the upper wall 15. Its lower surface is set such as to be slightly above the upper surface of the lower wall 16.

Adjacent solar battery panels 3 are arranged with their upper walls 15 set upward such that the outer wall 13 of the lower one of them abuts the outer wall 13 of the upper one of them via the intervening seal member 26 as best depicted in FIG. 2. In this state, the extension 25 of the lower frame member 7 of the upper one of them covers the upper wall 15 of the upper frame member 6 of the lower one of them.

The extension 25 has a length such that its end coincides with the end of the upper wall 15 of the upper frame member 6 in its state covering the upper wall 15 of the upper frame 6 of the lower solar battery panel 3 as noted above. In the overlap zone of the extension 25 of the lower frame member 7 of the upper solar battery panel 3 and the upper wall 15 of the upper frame member 6 of the lower solar battery panel 3, if the roof 1 has an inclination, the gap between the two is set such that no rainwater will rise by the capillary phenomenon and enter between the adjacent solar battery panels 3.

The upper and lower frame members 6 and 7 as noted above, are mounted on the solar battery 4 via the respective grading channel members 5 by disposing the upper wall 15 on the surface side of the solar battery 4, inserting the head portion 11 of each grading channel member 5 in each opening 18 and engaging the upper and lower engagement projections 21 in the respective upper and lower engagement grooves 5b.

In this state, the opening 18 in each of the upper and lower frame members 6 and 7 is closed by the head portion 11 of each grading channel member 5, and an inner cavity 19b is formed on the inner side of the inner wall 14.

Figure 5:
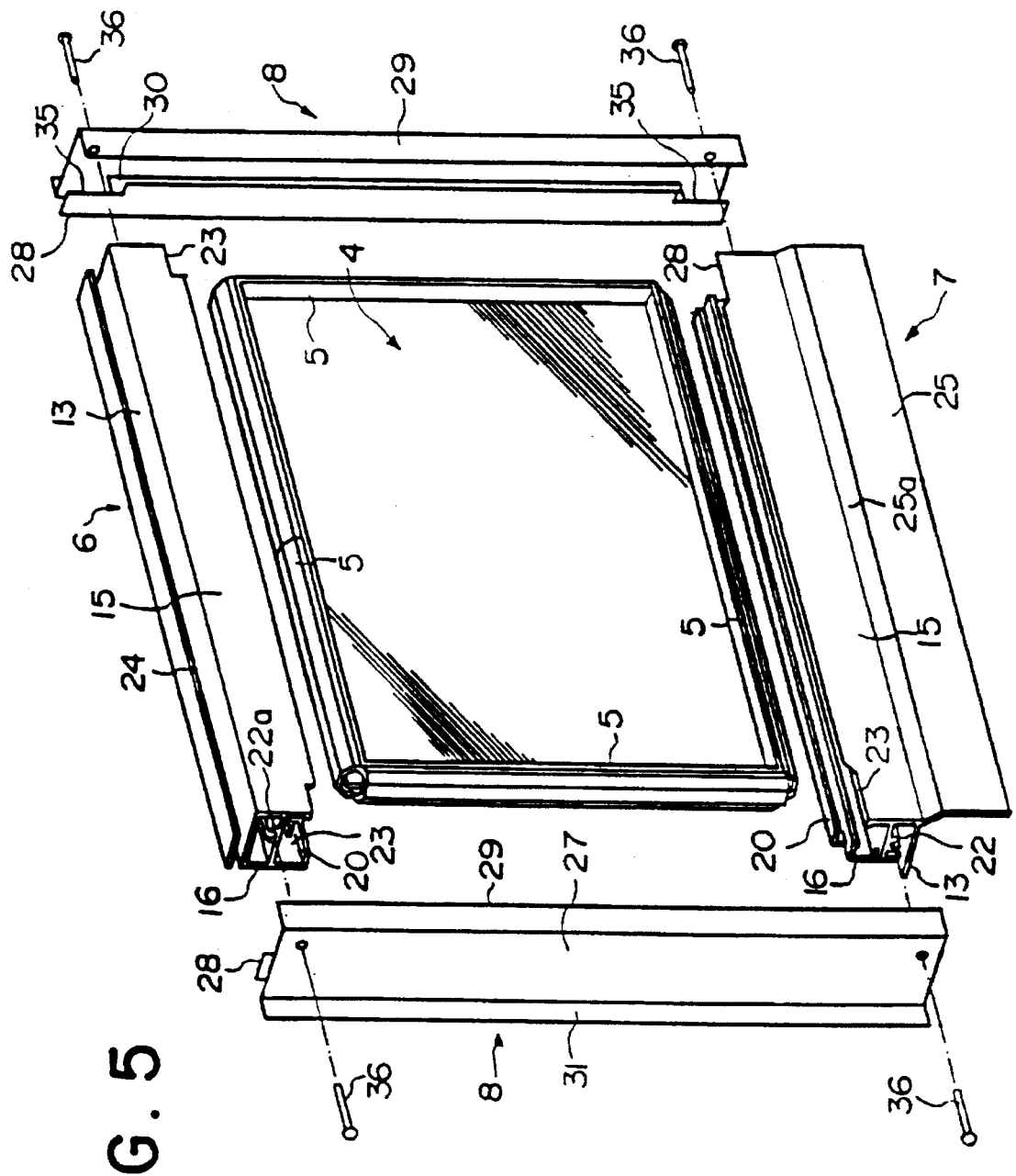
FIG. 5 is a disassembled perspective view showing the solar battery panel of the embodiment.

The vertical frame member 8, as shown in FIG. 5, integrally has an outer and an inner wall 27 and 28, which are parallel and face each other, an upper and a lower wall 29 and 30, which are parallel and face each other, and a securement portion 31 extending outward from the lower edge of the outer wall 27. The inner wall 28 has an opening 32 extending in the longitudinal direction. The frame member thus is cylindrical in shape having a rectangular sectional profile.

The lower wall 30 is located on the inner side of the lower edge of the outer and inner walls 27 and 28, and the opening 32 noted above is formed in the inner wall 28 between the lower and upper walls 30 and 29. The edge of the inner wall 28 adjacent the opening 32 has a short engagement projection 34, which extends toward the outer wall 27 and is tightly engaged in the corresponding engagement groove 5b of the grading channel member 5. Each edge of the inner wall 28 has a rectangular notch 35.

The vertical frame member 8 as described above, is mounted on the solar battery 4 via the grading channel member 5 by disposing the upper wall 29 on the surface side of the solar battery 4, inserting the head portion 11 of the grading channel 5 in the opening 32 and engaging the upper and lower engagement projections 34 in the upper and lower engagement grooves 5b. In this state, the opening 32 of the vertical frame member 8 is closed by the head portion 11 of the grading channel member 5, and an upper cavity 33a is formed inside the inner wall 28.

By mounting the upper, lower, and vertical frame members 6 to 8 via the respective grading channel members 5 as noted above, the opposite ends of the upper and lower frame members 6 and 7 enters the inside of the vertical frame members 8 with the engagement of the notches 23 and 25, and the outer walls 29 of the vertical frame members 8 cover the outer walls 29 of the upper and lower frame members 6 and 7. The frame members 6 to 8 are finally mounted on the four edges of the solar battery 4 via the grading channel members 5 by screwing bolts 36, which penetrate the outer walls 27 of the vertical frame members 8, through the bolt hole pieces 22 of the upper and lower frame members 6 and 7. In this way, the solar battery panel 3 is assembled.

Figure 4:
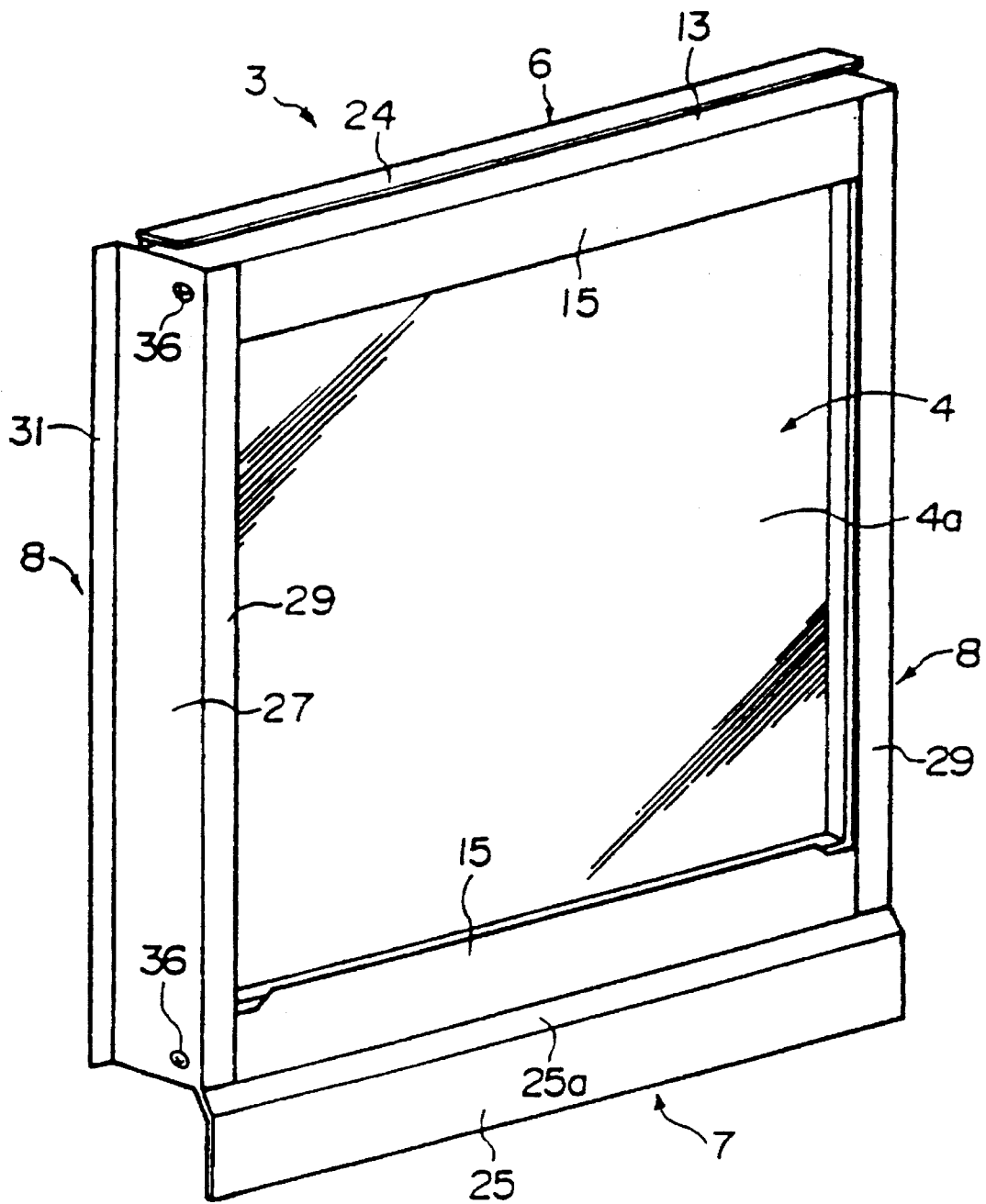
FIG. 4 is a perspective view showing a solar battery panel, in an assembled state, of the embodiment.

FIG. 4 shows the solar battery panel 3 in its assembled state. FIG. 5 shows it in a disassembled state.

In its assembled state, the opposite ends of the upper and lower frame members 6 and 7 are fitted in the inside of the vertical frame members 8 with the engagement of the notches 23 and 35. Thus, the inner cavities 19b of the upper and lower frame members 6 and 7 and the upper cavities 33a of the vertical frame members 8 are communicated with one another. Further, the surfaces of the upper walls 15 and 29 of the frame members 6 to 8 are at a somewhat higher level than the surface of the solar battery 4. Thus, the surface of the entirety of the solar battery panel 3 has a rectangular recess 4a corresponding to the solar battery 4.

A plurality of solar battery panels 3, having the construction as described above, are arranged (for instance two panels transversely and five panels longitudinally) over and secured to the upper surface of a face plate 2b of the base panel 2. However, they are not directly secured to the face plate 2b, but are secured to gutter-like support rails 37 which are secured to the face plate 2b.

Figure 3:
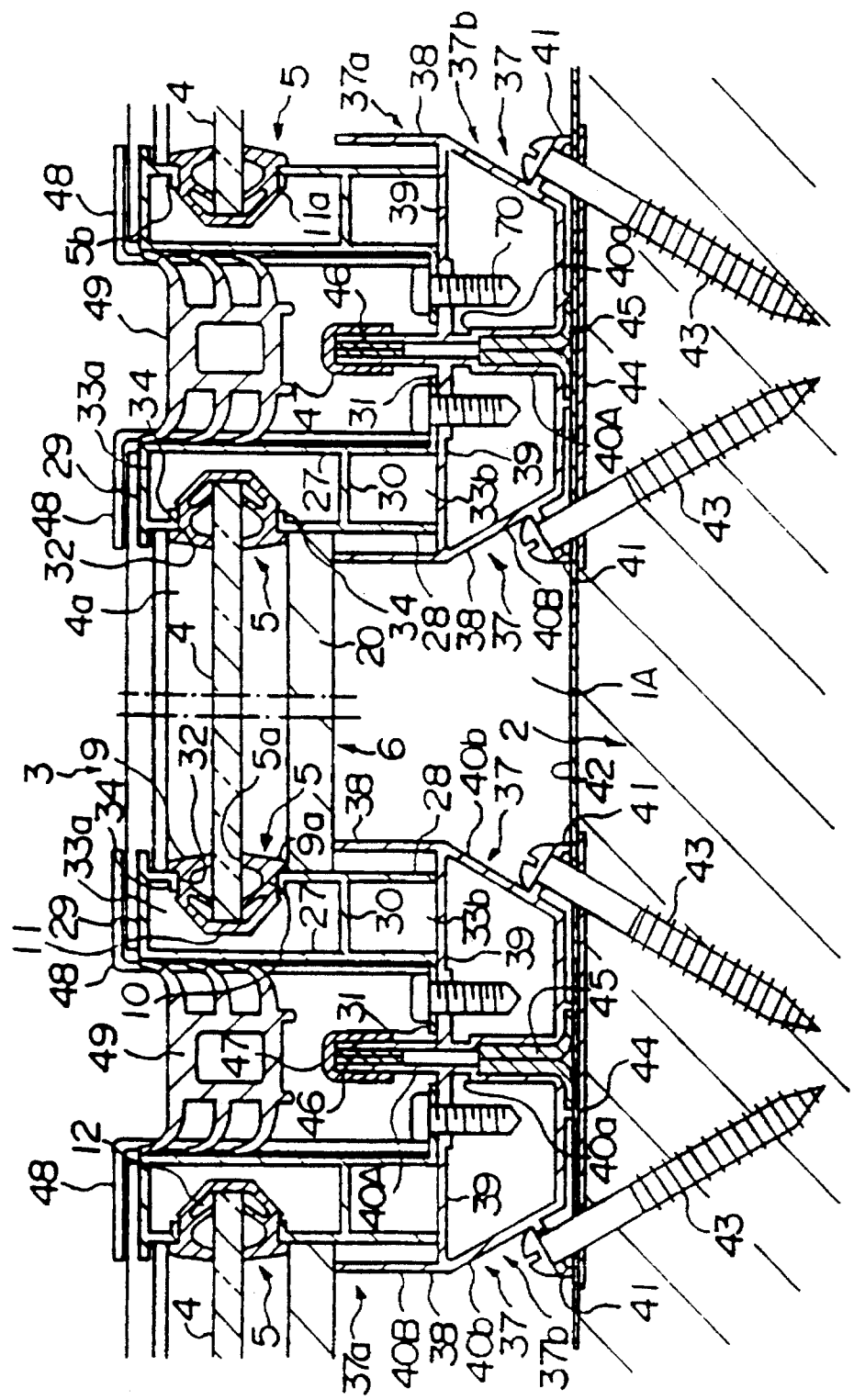
FIG. 3 is a sectional view taken along arrow line F—F in FIG. 2.

The support rail 37, as shown in FIG. 3, has a vertically two-stage structure, comprising a gutter-like frame 38 having a substantially U-shaped sectional profile and open at the top and a plate-like support 39 formed within the frame 38, the support 30 being common to an upper gutter section 37a and a lower cylindrical section 37b.

The gutter-like frame 38 has a pair of, i.e., left and right, vertical walls 40. In the cylindrical section 37b, one of the vertical walls 40 extends basically substantially upright although it has a slight bent profile 40a formed on the inner side in the width direction and bent in a fashion like a crankshaft profile. The other vertical wall 40 is an inclined wall 40b inclined toward the inner side. The vertical wall 40 with the bent profile 40a is referred to as outer vertical wall 40A, and that with the inclined portion 40b as inner vertical wall 40B. The inclined portion 40b of the inner vertical wall 40B has a longitudinally extending integral securement piece 41 at right angles to the inclined portion 40b. The end of the securement piece 41 is located on the extension of the inner vertical wall 40 in the gutter section 37a.

These support rails 37 are arranged in pairs of them at a predetermined interval on and secured to the face plate 2b of the base panel 2 with asphalt roofing 42 applied thereto such that their longitudinal direction is in the longitudinal direction of the base panel 2 and that the paired vertical frame members 8 of each solar battery panel 3 are accommodated in their corresponding gutter sections 37a.

More specifically, the pairs of support rails 37 are parallel such that their inner vertical walls 40B face each other. Core members 2a extending in the longitudinal direction of the base panel 2, are secured to the underside of the face plate 2b, on which the support rails 37 are supported. The support rails 37 are secured to the base panel 2 by driving bolts 43 passed through the securement pieces 41.

The asphalt roofing 42 is secured to the face plate 2b by double sided adhesive tapes 44, which are applied to portions of the face plate 2b that support the support rails 37. All the solar battery panels 3 which are arranged in the longitudinal direction of the base panel 2, are collectively secured to the base panel by the pairs of support rails 37. In each zone where adjacent solar battery panels 3 face each other in the width direction (other than the direction of roof inclination), two support rails 37 are secured in close proximity of each other.

With these close proximity support rails 37, the outer vertical walls 40A thereof face each other with a slight play defined between them. An upper and a lower seal member 45 and 46 are provided between the two outer vertical walls 40A, and a further seal member 47 is mounted such that it strides the two outer vertical walls. These seal members extend over the entire length of the outer vertical walls. The space between the adjacent solar battery panels 3 is closed by a gasket 49.

A plurality of solar battery panels 3 are secured to the paired support rails 37 with their upper frame member 6 on the side of the ridge M, with their lower frame member 7 on the side of the eaves N and with their vertical frame members 8 supported on the supports 39 of the gutter sections 37a.

In this state, under upper cavity 33a of each vertical frame member 8 is formed lower cavity 33b, which is defined by the outer and inner walls 27 and 28, lower wall 30 and support 38. The upper and lower cavities 33a and 33b of the vertical frame member 8 are communicated with the inside of the gutter section 37a of the support rail 37, that is, the inner cavities 10b of the upper and lower frame members 6 and 7 are communicated with the inside of the gutter sections 37a of the paired support rails 37 via the upper cavities 33a of the vertical frame members 8.

Adjacent ones of the solar battery panels 3, which are secured to the pair support rails 37 (i.e., arranged in the longitudinal direction of the base panel 2) are abutted against each other via the intervening seal member 26 noted above. In this state, the extension 25 of the lower frame member 7 of the solar battery panel 3, which is disposed as roof Y on the side of the ridge M, covers the upper wall 15 of the upper frame member 6 of the solar battery panel 3 on the side of the eaves N. The end of the extension 25 coincides with the end of the upper wall 15.

In each zone of connection of adjacent solar battery panels 3, a reinforcement member 48 is secured thereto. In this embodiment of the roof panel 1 with solar batteries, in which a plurality of solar battery panels 3 are disposed over the base panel 2 via the support rails 37, ventilating layers 1A are formed between the solar battery panels 3 and the base panel 2. These ventilating layers 1A are defined by the frame members 6 to 8 and support rails 37.

The roof panel 1 with solar batteries as above, is secured as house roof Y to beams (not shown) such that it extends from the ridge M of the eaves M with the upper frame member 6 of each secured solar battery panel 3 directed toward the ridge M.

Figure 6:
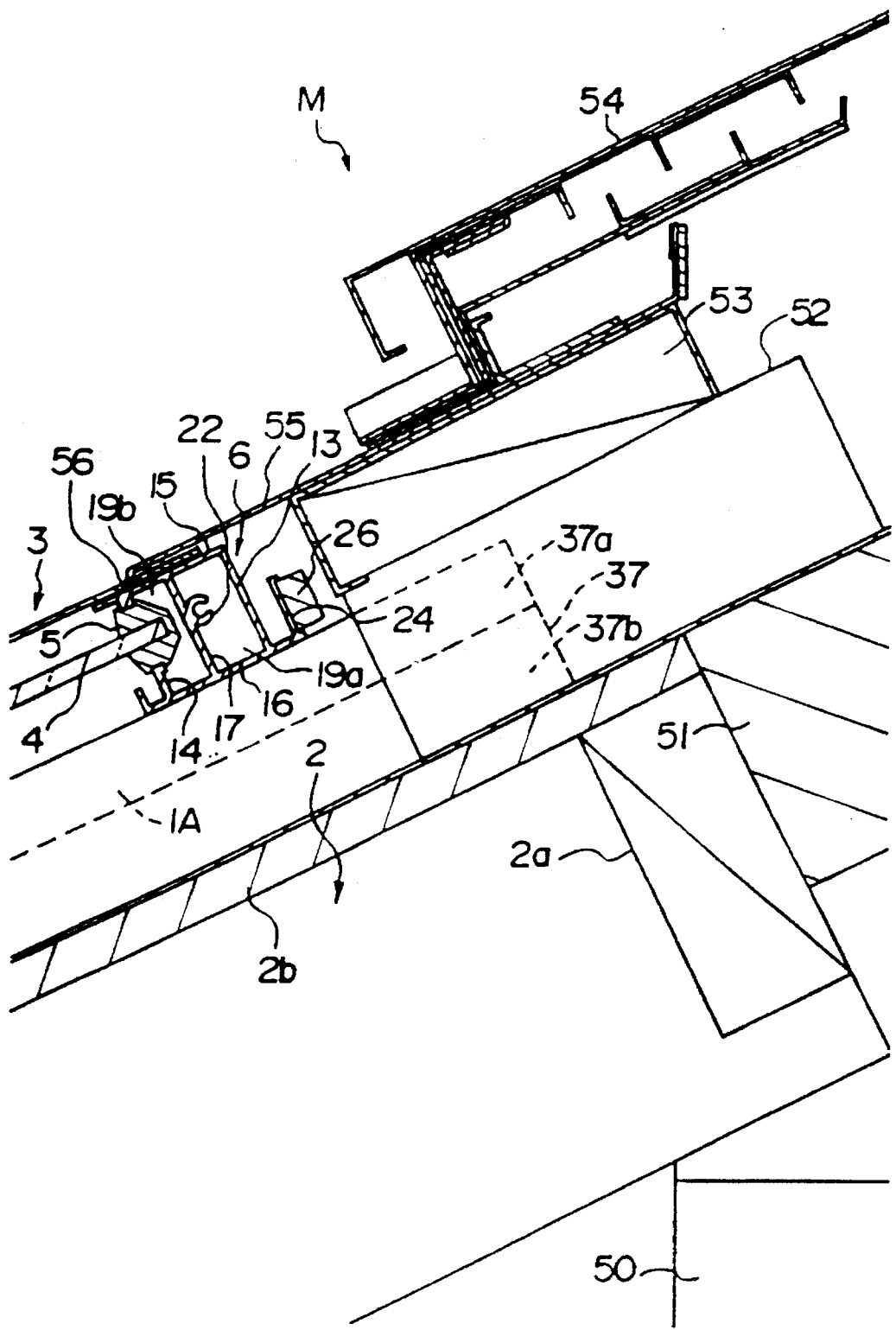
FIG. 6 is a sectional view showing a portion of the embodiment adjacent the ridge.

The ridge M, as shown in FIG. 6, comprises a ridge beam 50, each coupling beam 51, each upper beam 52, each ventilating structure support 53, each ventilating structure 54, etc. A ridge water blocking member 55 is disposed between the upper frame member 6 of the solar battery panel 3 closest to the ridge M and the ventilating structure support 53. The gap between the lower edge of the ridge water blocking member 55 and the upper frame member 6 is closed by a seal member 56 of urethane or like material.

The ventilating layers 1A of the roof panel 1 have their end on the side of the ridge M communicated with the inside of the ventilating structure 54 and thence to the outside of the house.

Figure 7:
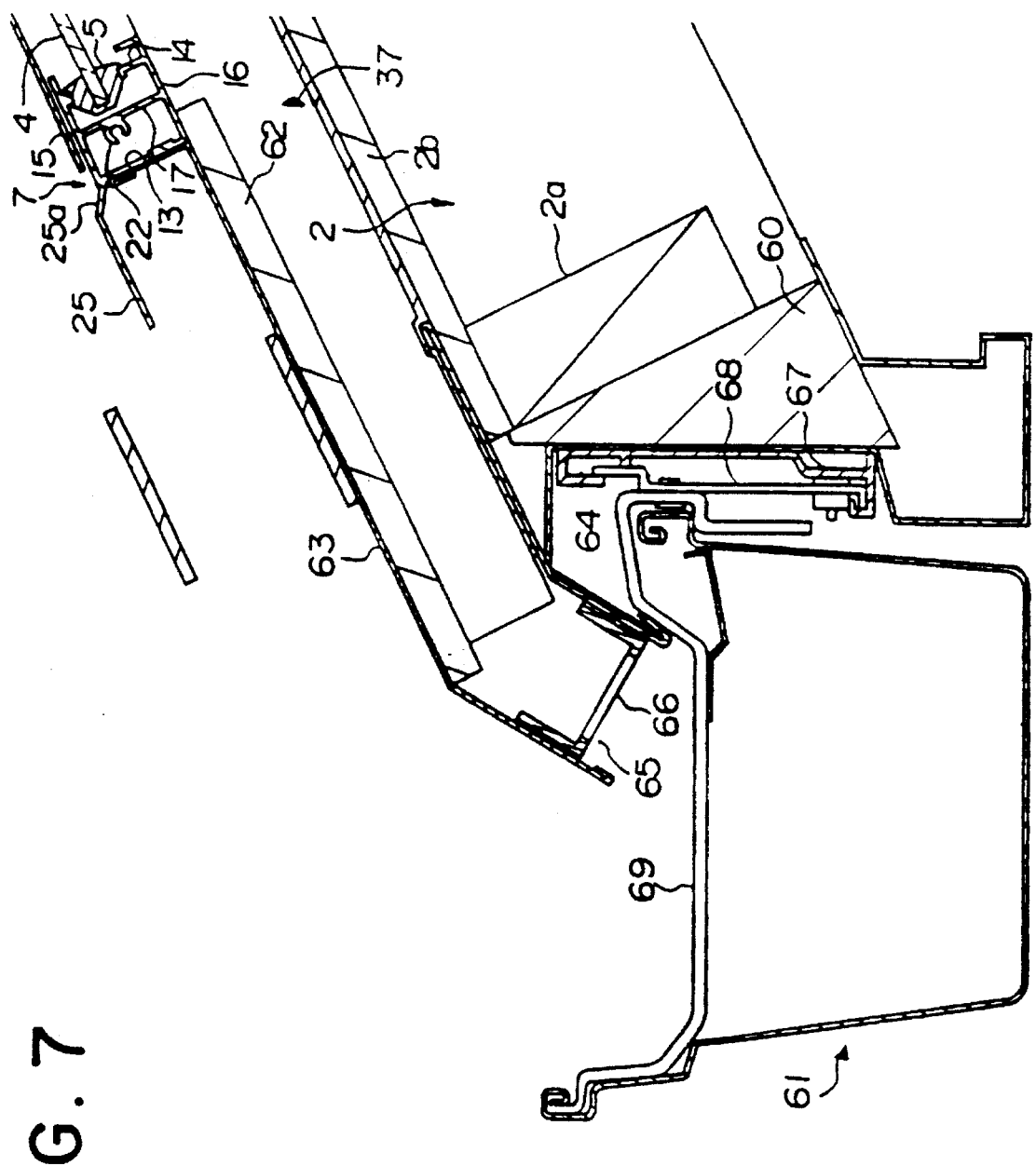
FIG. 7 is a sectional view showing a portion of the embodiment adjacent the eaves.

The eaves N, as shown in FIG. 7, has a coupling beam 60 and a gutter 61. A predetermined space is provided between the solar battery panel 3 closest to the eaves N and the inner or outer end thereof. An eaves panel 62 is disposed to entirely cover this space. An eaves water blocking plate 63 is provided on the eaves panel 62. In the eaves N, the eaves panel 62 is secured to the parallel support rails 37 extending in the longitudinal direction. A lower eaves water blocking plate 65 is on a portion of the top surface of the base panel 2 corresponding to the lower end of the eaves N. The water blocking plates 63 and 64 are bent to be of a greater inclination than the inclination of the roof Y such that an opening 65 defined by them extends in the gutter 61. The opening 65 is closed by a perforated ventilating member 66.

The ventilating layers 1A of the roof panel 1 face the ventilating member 66 at their end on the side of the eaves N and are communicated with the outside of the house through numerous pores of the perforated ventilating member 66.

The gutter 61 is provided on the eaves N via brackets 67 and 68 mounted on the coupling beam 60 and a hanging member 69.

While the above roof structure is an embodiment of the invention, in this roof structure, a plurality of solar battery panels 3 are supported on the gutter-like support rails 7, and seam zones of adjacent solar battery panels 3 arranged side-by-side in the horizontal direction are supported by the support rails 37. The seam zones thus can provide water blocking without need of any special water blocking structure.

More specifically, rainwater falling on the roof flows along the solar battery panels 3 or support rails 37 to the gutter 61.

First, rainwater flowing along the solar battery panels 3 flows along the surface of each solar battery panel in the order of upper frame member 6, solar battery 4, and lower frame member 7. Since the extension 25 of the lower frame member 7 covers the upper wall 15 of the upper frame member of the adjacent lower solar battery panel 3, rainwater will not enter the solar battery panels through the gap between these upper and lower frame members.

In addition, since a certain length is ensured for the overlap zone between the two frame members, even in the presence of a strong wind no rainwater will enter the solar battery panels 3.

Further, since the end of the extension 25 of the lower frame member 7 coincides with the end (i.e., inner end) of the upper frame member 6 of the adjacent lower solar battery panel 3, the lower frame member 7 is not exposed on the surface. It is thus possible to obtain improvement of the appearance.

Further, if rainwater flowing over the solar battery panels 3 enters the gap between solar battery 4 and grading channel members 5, it is reliably drained through the inside of the upper, lower, and vertical frame members 6 to 8.

More specifically, rainwater intruding through the gaps between solar battery 4 and grading channel members 5, is led by the engagement projections 21 and 34 directed to the outer side of the frame members 6 to 8 to enter the inner and outer cavities 19b and 33a. Since the inner cavities 19b of the upper and lower frame members and the upper cavities 33a of the vertical frame members 8 are communicated with one another, the rainwater that enters the inner cavity of the upper or lower fame member 6 or 7 flows into the upper cavities 33a of the vertical frame members 8. The rainwater entering the upper cavities 33a of the vertical frame members 8, is led in the downward inclined direction and through the continuous upper cavities 33a in the adjacent solar battery panel 3 on the side of the eaves N to eventually reach the top surface of the eaves water blocking plate 63 and thence flow down into the gutter 61, or it falls at intermediate positions into the inside of gutter sections 37a of support rails 37 to flow down to the eaves N and enter the gutter 61 through the pores of the ventilating member 66.

Rainwater flowing along the support rail 37 flows over the gasket 49. If rainwater enters gutter section 37a of the support rail 37 through between gasket 49 and vertical frame member 8, it flows along the gutter section 37a down to the eaves N and falls into the gutter 61 through the ventilating pores of the ventilating member 66.

Rainwater flowing along the gutter section 37a may leak down through the portions of the support 39 that are penetrated by self-tapping bolts 70. However, since the support rail 37 has the two-stage structure comprising the gutter section 37a and the lower cylindrical section 37b, the leaking rainwater is received in the lower cylindrical section 37b and does not further leak down but completely flows down along the cylindrical section 37b into the gutter 61. It is thus possible to completely prevent leakage of rainwater.

Further, since the support rails 37 are arranged parallel such that every two of them are disposed in back-to-back arrangement in each zone, in which adjacent solar battery panels 3 face each other in the direction perpendicular to the direction of roof inclination, only one of these back-to-back arrangement support rails (on the side of the inner vertical wall 40B) may be used for the support, that is, it is possible to use the same kind of support frames at the end of the horizontal solar battery arrangement (without adjacent solar battery in the direction of roof inclination) and also at intermediate positions of the flow (with adjacent solar battery).

Further, since the two back-to-back arrangement support rails 37 are arranged such that the seal members 45 and 46 are clamped between their outer vertical walls 40A and that the seal member 47 is mounted such as to stride the upper ends of the two outer vertical walls 40A, it is possible to ensure the water blocking between the two support rails 37.

Further, in the above roof structure, wind flowing outside is led through the ventilating pores of the ventilating member 66 provided at the eaves N and through the ventilating layers 1A in the roof panel 1 into the ridge ventilating structure 54 to be discharged thence to the outside of the house.

Such flow of wind (i.e., air) effects heat dissipation to suppress temperature rise of the solar batteries 4. It is thus possible to maintain a high energy conversion efficiency of the solar batteries 4 and permit stable power supply.

Further, the ventilating member 66, which serves as an inlet of air to the ventilating layers 1A, can also serve the function of a spacer for maintaining a constant space between the upper and lower ,eaves water blocking members 63 and 64.

Further, rainwater which may rarely enter the solar batteries 4 from the surroundings thereof, is received by the surface of the base panel 2 facing the ventilating layers 1A (which is provided with the water-proof asphalt roofing 42 applied to it), and thus can be drained toward the eaves N.

Further, since the solar battery panel 3 in this embodiment has the recess 4a in its surface in correspondence to the solar battery 4, at the time of the snowfall the recess 4a may serve to collect a certain amount of snow and provide a snow blocking effect.

What is claimed is:

1. A roof panel with a solar array for mounting on top of a roof comprising:

a base panel adapted to be disposed on the roof to extend in the direction of the roof pitch and having a plurality of substantially parallel gutter-shaped support rails secured to the base panel to extend in the direction of roof pitch;

said support rails each have a two-stage structure including a gutter section capable of accommodating an associated portion of each said frame and a cylindrical section formed under and integral with said gutter section; and a plurality of solar array panels disposed over said base panel, each solar array panel including a solar array and a frame mounted around said solar array, said frame being supported such that it is sealably connected to associated ones of said support rails.

2. The roof panel with solar batteries according to claim 1, wherein:

each said frame includes four cylindrical frame members, two of said frame members being an upper and a lower frame member mounted on two parallel edges of the four edges of each said solar battery, the other two of said frame members being a left and a right vertical frame member mounted on the other two of said four edges; and said left and right vertical frame members are supported such that they are accommodated inside associated ones of said gutter-shaped support rails, at least the inner space in said lower frame member being communicated with the inside of said associated gutter-like support rails.

3. The roof panel with solar batteries according to claim 1, wherein:

each said frame includes four cylindrical frame members, two of said frame members being an upper and a lower frame member mounted on two parallel edges of the four edges of each said solar battery, the other two of said frame members being a left and a right vertical frame member mounted on the other two of said four edges; and said left and right vertical frame members are supported such that they are accommodated inside associated ones of said gutter-shaped support rails, at least the inner space in said lower frame member being communicated with the inside of said associated gutter-like support rails.

4. A roof panel with a solar array for mounting on top of a roof comprising:

a base panel adapted to be disposed along the roof inclination from the ridge to the eaves;

a plurality of solar battery panels disposed over said base panel and each including a solar battery in the form of a rectangular panel and a frame mounted around said solar battery, said frame having an extension extending from its eaves side portion and covering the top of a ridge side portion of the frame of the eaves side adjacent solar battery panel, said extension having an end substantially aligned to the eaves side end of a ridge side portion of the frame of the eaves side adjacent solar battery panel;

a plurality a parallel gutter-shaped support rails secured to the top of said base panel and extending in the direction of the roof inclination;

said support rails each having a two-stage structure including a gutter section capable of accommodating an associated portion of each said frame and a cylindrical section formed under and integral with said gutter section; and said frame being supported such that it is accommodated inside associated ones of said gutter sections.

5. The roof panel with solar batteries according to claim 4, wherein:

each said frame includes four cylindrical frame members, two of said frame members being an upper and a lower frame member mounted on two parallel edges of the four edges of each said solar battery, the other two of said frame members being a left and a right vertical frame member mounted on the other two of said four edges; and said left and right vertical frame members are supported such that they are accommodated inside associated ones of said gutter-shaped support rails, at least the inner space in said lower frame member being communicated with the inside of said associated gutter-shaped support rails.

6. A roof panel with a solar array for mounting on top of a roof comprising:

a base panel adapted to be disposed along the roof inclination from the ridge to the eaves and having a plurality of parallel gutter-shaped support rails secured at the top and extending in the direction of the roof inclination, each said support rail having a two-stage structure including a gutter section capable of accommodating an associated portion of each said frame and a cylindrical section formed under and integral with said gutter section; and a plurality of solar battery panels disposed over said base panel and each including a solar battery in the form of a rectangular panel and a frame mounted around said solar battery, said frame being supported such that it is accommodated inside associated ones of said support rails, said frame including four cylindrical members, two of said frame members being an upper and a lower frame member mounted on two parallel edges of the four edges of said solar battery, the other two of said frame members being a left and a right vertical frame member mounted on the other two of said four edges, said left and right vertical frame members being supported such that they are accommodated inside associated ones of said gutter-shaped support rails, at least the inner space in said lower frame member being communicated with the inside of said associated gutter-shaped support rails, said frame having an extension extending from its eaves side portion and covering the top of a ridge side portion of the frame of the eaves side adjacent solar battery panel, said extension having an end substantially aligned to the eaves side end of a ridge side portion of the frame of the eaves side adjacent solar battery panel.

7. The roof panel with solar batteries according to claim 6, wherein:

said support rails are provided in pairs each in correspondence to facing sides of adjacent ones of said solar battery panels in a direction perpendicular to the direction of roof inclination;

a seal member is provided between adjacent side vertical walls of said gutter sections of said paired adjacent support rails; and another seal member is provided such that it strides the upper ends of said two adjacent side vertical walls.

8. The roof panel with solar batteries according to claim 6, wherein:

a predetermined space serving as a ventilating layer is formed between the back surface of each said solar battery panel and said base panel; and said ventilating layer is open to the outside at its eaves and ridge side edges.

9. A roof structure with a solar array comprising:

a roof having a base panel adapted to be disposed on the roof to extend in the direction of the roof pitch, with a plurality of substantially parallel gutter-shaped support rails secured to the base panel to extend in the direction of the roof pitch;

said support rails each having a two-stage structure including a gutter section capable of accommodating an associated portion of each said frame and a cylindrical section formed under and integral with said gutter section; and a plurality of solar array panels adapted to be disposed over said base panel and each solar array panel including a solar array in the form of a rectangular panel and a frame mounted around said solar array, said frame being supported such that it is sealably connected to associated ones of said support rails.

10. The roof structure with solar batteries according to claim 9, wherein:

each said frame includes four cylindrical frame members, two of said frame members being an upper and a lower frame member mounted on two parallel edges of the four edges of each said solar battery, the other two of said frame members being a left and a right vertical frame member mounted on the other two of said four edges; and said left and right vertical frame members are supported such that they are accommodated inside associated ones of said gutter-shaped support rails, at least the inner space in said lower frame member being communicated with the inside of said associated gutter-shaped support rails.

11. The roof structure with solar batteries according to claim 9, wherein:

each said frame includes four cylindrical frame members, two of said frame members being an upper and a lower frame member mounted on two parallel edges of the four edges of each said solar battery, the other two of said frame members being a left and a right vertical frame member mounted on the other two of said four edges; and said left and right vertical frame members are supported such that they are accommodated inside associated ones of said gutter-shaped support rails, at least the inner space in said lower frame member being communicated with the inside of said associated gutter-shaped support rails.

12. A roof structure with a solar array comprising:

a roof including a base panel disposed along the roof inclination from the ridge to the eaves;

a plurality of solar array panels disposed over said base panel and each including a solar array in the form of a rectangular panel and a frame mounted around said solar array, said frame having an extension extending from its eves side portion and covering the top of a ridge side portion of the frame of the eves side adjacent solar array, said extension having an end substantially aligned to the eves side end of a ridge side portion of the frame of the eves side adjacent solar array panel;

a plurality of substantially parallel gutter-shaped support rails secured to the top of said base panel and extending in the direction of the roof inclination;

said support rails each having a gutter-shaped two-stage structure including a gutter section capable of accommodating an associated portion of each said frame and a cylindrical section formed under and integral with said gutter section; and said frame being supported such that it is accommodated inside associated ones of said gutter sections.

13. The roof structure with solar batteries according to claim 12 wherein:

each said frame includes four cylindrical frame members, two of said frame members being an upper and a lower frame member mounted on two parallel edges of the four edges of each said solar battery, the other two of said frame members being a left and a right vertical frame member mounted on the other two of said four edges; and said left and right vertical frame members are supported such that they are accommodated inside associated ones of said gutter-shaped support rails, at least the inner space in said lower frame member being communicated with the inside of said associated gutter-shaped support rails.

14. A roof structure with solar array comprising:

a roof including a base panel disposed along the roof inclination from the ridge to the eaves and having a plurality of parallel gutter-shaped support rails secured at the top and extending in the direction of the roof inclination, each said support rail having a two-stage structure including a gutter section capable of accommodating an associated portion of each said frame and a cylindrical section formed under and integral with said gutter section; and a plurality of solar battery panels disposed over said base panel and each including a solar battery in the form of a rectangular panel and a frame mounted around said solar battery, said frame being supported such that it is accommodated inside associated ones of said support rails, said frame including four cylindrical members, two of said frame members being an upper and a lower frame member mounted on two parallel edges of the four edges of said solar battery, the other two of said frame members being a left and a right vertical frame member mounted on the other two of said four edges, said left and right vertical frame members being supported such that they are accommodated inside associated ones of said gutter-shaped support rails, at least the inner space in said lower frame member being communicated with the inside of said associated gutter-shaped support rails, said frame having an extension extending from its eaves side portion and a covering the top of a ridge side portion of the frame of the eaves side adjacent solar battery panel, said extension having an end substantially aligned to the eaves side end of a ridge side portion of the frame of the eaves side adjacent solar battery panel.

15. The roof structure with solar batteries according to claim 14, wherein:

said support rails are provided in pairs each in correspondence to facing sides of adjacent ones of said solar battery panels in a direction perpendicular to the direction of roof inclination;

a seal member is provided between adjacent side vertical walls of said gutter section of said paired adjacent support rails; and another seal member is provided such that it strides the upper ends of said two adjacent side vertical walls.

16. The roof structure with solar batteries according to claim 14, wherein:

a predetermined space serving as a ventilating layer is formed between the back surface of each said solar battery panel and said base panel; and said ventilating layer is open to the outside at its caves and ridge side edges.

* * * * *